No. 806,108. PATENTED DEC. 5, 1905.
F. L. CLARK.
AUTOMATIC PRESSURE REDUCING VALVE.
APPLICATION FILED JAN. 15, 1903.

WITNESSES
Jas. B. MacDonald
J. C. Custer

INVENTOR,
Francis L. Clark
By Wright
Att'y.

UNITED STATES PATENT OFFICE.

FRANCIS L. CLARK, OF PITTSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

AUTOMATIC PRESSURE-REDUCING VALVE.

No. 806,108.     Specification of Letters Patent.     Patented Dec. 5, 1905.

Application filed January 15, 1903. Serial No. 139,159.

*To all whom it may concern:*

Be it known that I, FRANCIS L. CLARK, a citizen of the United States, residing in Pittsburg, county of Allegheny, State of Pennsylvania, have invented a certain new and useful Improvement in Automatic Pressure-Reducing Valves, of which improvement the following is a specification.

This invention relates to fluid-pressure brakes, and more particularly to what is known as the "high-speed brake," which is now employed upon trains adapted to run at high speeds and in which the normal pressure carried in the brake system is much greater than in ordinary train service.

In the high-speed-brake equipment as heretofore used a pressure-reducing valve or "blow-down" valve has been applied to the brake-cylinder for the purpose of limiting the accumulation of a pressure therein to a certain amount in service applications of the brakes and for gradually reducing the pressure obtained in an emergency application to a predetermined point. Valves of this type are exemplified in prior patent, No. 506,185, of October 3, 1893.

One of the objects of the present invention is to provide a valve of this type which will open and close at substantially the same pressure.

Figure 1:
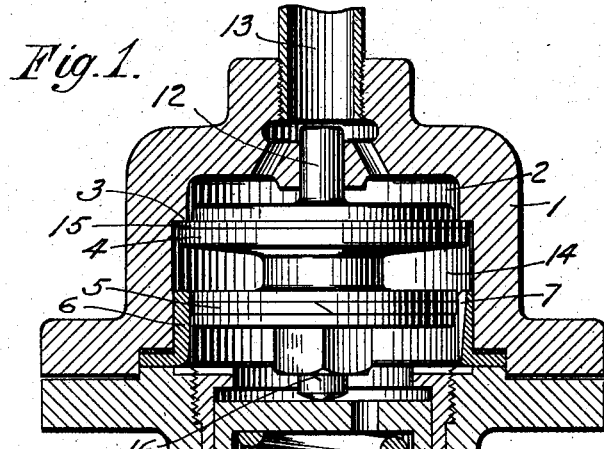
Figure 3:
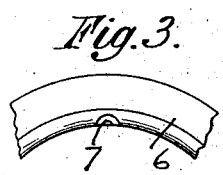
Figure 2:
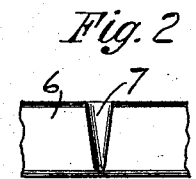
Figure 4:
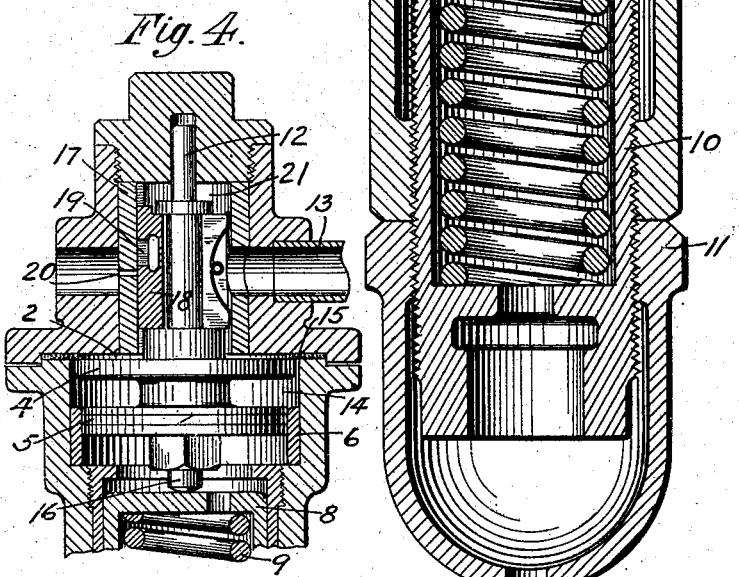
Figure 5:
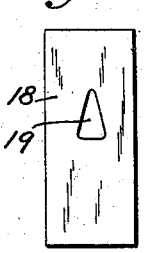

In the accompanying drawings, Figure 1 is a central sectional view of a valve embodying my invention; Fig. 2, a side view, and Fig. 3 a plan, of a portion of the cylinder-bushing, showing the V-shaped groove therein; Fig. 4, a sectional view showing a modification, and Fig. 5 a face view of the slide-valve, showing the triangular port.

As shown in Fig. 1 of the drawings, my improved valve device comprises a casing 1, which may be formed in two or more parts and having a shoulder or inwardly-projecting offset 3 dividing the interior chamber into two cylindrical spaces 2 and 14 of different diameters. In the chamber is located a movable abutment having heads 4 and 5, the valve-head 4 being of slightly less diameter than the cylindrical chamber 14 and adapted to seat against the shoulder 3, at which point a tight joint may be made by means of a gasket 15. The piston-head 5 is fitted within a bushing 6, secured in the chamber 14, the inner diameter of the bushing being substantially the same as that of the cylinder 2.

In the cylinder wall or bushing 6 is formed a V-shaped groove 7, which is tapered toward its lower end and comprises an escape-port around the piston-head 5, the port being open widest when the piston is at its uppermost or normal position and nearly closed when the piston is forced down to its lowest position.

The movable abutment is provided on its upper side with a suitably-guided stem 12 and on its lower side with a stem 16, engaging the perforated cap 8, against which the spring 9 bears. An adjusting-nut 10 is threaded onto the casing for adjusting the tension of the spring and is covered by the cap lock-nut 11. A pipe 13 leading from the brake-cylinder establishes communication with the chamber 2 above the sliding abutment. The spring 9 is adjusted to hold a certain pressure—say sixty pounds per square inch—in the brake-cylinder, and so long as the brake-cylinder pressure does not exceed this amount the valve-head 4 remains seated against the offset or shoulder 3, preventing the escape of any air from the brake-cylinder. When the brake-cylinder pressure rises above this point, the abutment is forced down against the spring and the valve-head 4 moves away from its seat against the shoulder 3, thus allowing the compressed air at brake-cylinder pressure to pass around the head 4 and act upon the balancing piston-head 5. This piston-head 5 being substantially of the same diameter as the cylinder 2, the effective abutment area exposed to the brake-cylinder pressure is practically the same after the piston moves down as when the valve-head is closed against its seat. If the excessive brake-cylinder pressure is due to a service application of the brakes, the piston moves down but a short distance, leaving the escape-port 7 nearly wide open, and the maximum area of this port being calculated to release air from the cylinder at about the same rate that it may enter through the graduating-port of the triple valve the brake-cylinder pressure in service applications is thus limited to a predetermined maximum. In the case of an emergency application of the brakes under a high-pressure system a much greater pressure is rapidly charged into the brake-cylinder, forcing the piston-valve to the lowermost limit of its movement, at which point the opening of the escape-port is very small, thus permitting at first a very slow escape of air from the brake-cylinder, which rate of flow gradually increases as the piston moves upward until the maximum service-pressure is reached, when the valve closes by the head 4 seating against the shoulder 3.

According to the modification shown in Fig. 4, the upper stem 12 of the piston extends through a valve-chamber 21, having bushing 17, and operates the slide-valve 18, which engages a seat in the bushing. The valve-seat in the bushing is provided with an escape-port 20 and the slide-valve with a triangular-shaped port 19, the widest end of which is located adjacent to the escape-port 20, as shown when seated against the gasket in normal position. The operation of this form of my improvement is substantially the same as that previously described, with the exception that the escape-port is controlled by the slide-valve instead of directly by the piston. When upon a service application of the brakes an excessive pressure is produced in the brake-cylinder, this pressure acting in chamber 2 upon the head 4 causes the piston to move downward to a position where the widest part of the port 19 registers with escape-port 20, which is of equal width. When the piston is moved away from its seat, the air under pressure passes around the head 4 and acts upon the head 5, so that the effective area of the abutment or piston exposed to fluid-pressure is the same as when said piston is seated. Then as soon as the excess pressure has escaped to the atmosphere the piston returns to its seat and the escape-port 20 is closed. In case of an emergency application of the brakes the piston is forced suddenly downward to its lowest position, in which only the narrowest portion of port 19 registers with the escape-port 20, thus permitting a very slow release of air from the brake-cylinder. This rate of discharge then gradually increases as the slide-valve is moved upward by the piston until the pressure is sufficiently reduced to allow the valve to close and the piston is again pressed against its seat or gasket. By means of this construction it will be seen that the pressure at which the valve closes will be substantially the same as that required to open the valve, and this is of great advantage, since in these valve devices as heretofore constructed the additional area exposed to pressure when the valve opens causes the same to remain open until the pressure has been reduced to a point considerably below that required to open the valve.

It will be evident that various forms of my improved valve device may be devised in which an abutment head or valve which is normally held against its seat is provided with means for balancing the additional area exposed to fluid-pressure when the abutment or valve head is moved away from its seat. It will also be apparent that any desired size of balancing-piston may be used for securing a certain predetermined ratio between the respective opening and closing pressures.

Having now described my invention, what I claim as new, and desire to secure by Letters Patent, is—

1. A pressure-reducing-valve device, comprising a casing containing a chamber having a shoulder or seat, a movable abutment having a head normally engaging said seat and means for balancing the additional area exposed to fluid-pressure when the abutment-head is moved away from its seat.

2. A pressure-reducing-valve device, comprising a casing containing a chamber having a shoulder or seat, a movable abutment exposed on one side to fluid-pressure, a load device for normally holding the abutment against said seat and a balancing-piston which is exposed to the fluid-pressure when the abutment is forced away from its seat.

3. A pressure-reducing-valve device comprising a casing containing a fluid-pressure chamber having a seat, a movable abutment, and means for normally holding the same against said seat, said abutment adapted to move away from its seat under high pressure and having its effective area exposed to fluid-pressure substantially constant for all positions.

4. A pressure-reducing-valve device comprising a casing having an interior chamber provided with a shoulder or seat, a sliding abutment having a valve-head adapted to engage said seat and a piston-head of substantially the same diameter as the chamber above the valve.

5. A pressure-reducing-valve device comprising a casing containing a chamber having an annular seat or shoulder, a sliding abutment normally engaging said seat and having a substantially constant effective area exposed to fluid-pressure, and a spring acting on said abutment in opposition to the fluid-pressure.

6. A pressure-reducing valve comprising a casing containing a chamber having an annular seat or shoulder, a sliding abutment having one head normally engaging said seat, and another head of substantially the same area as the chamber above the shoulder, means for establishing communication around the first-mentioned head when the same is moved away from its seat, a spring bearing against said abutment and an escape-port controlled by the movement of said abutment.

7. A pressure-reducing-valve device comprising a casing containing a chamber having an annular seat or shoulder, a sliding abutment in said chamber having a valve-head normally seated against said shoulder, a balancing piston-head, an escape-groove in the wall of said chamber around the piston-head and a spring acting against said piston.

8. A pressure-reducing-valve device comprising a casing containing a chamber having an annular seat or shoulder, a piston or abutment exposed on one side to fluid-pressure for operating the valve, a spring for normally holding the piston seated against said shoulder and means for maintaining the effective area subject to fluid-pressure substantially constant for all positions of the piston.

In testimony whereof I have hereunto set my hand.

FRANCIS L. CLARK.

Witnesses:
   R. F. EMERY,
   EDWARD A. WRIGHT.